United States Patent [19]

McClure

[11] Patent Number: 4,500,128

[45] Date of Patent: Feb. 19, 1985

[54] DEVICE FOR CARRYING FISHING RODS

[76] Inventor: John McClure, 2145 Brescia, Claremont, Calif. 91711

[21] Appl. No.: 497,685

[22] Filed: May 24, 1983

[51] Int. Cl.³ ............................................. B65D 71/00
[52] U.S. Cl. ................................. 294/146; 211/60 R; 294/163
[58] Field of Search ....................... 294/143, 146–148, 294/159–163, 165, 166, 168, 170; 206/315.1, 315.2, 315.6, 315.11; 211/60 R, 60 G, 60 T, 62, 64, 68, 69; 224/913, 922

[56] References Cited

U.S. PATENT DOCUMENTS

| | | |
|---|---|---|
| D. 238,824 | 2/1976 | Michal . |
| D. 254,696 | 4/1980 | Adams . |
| D. 261,571 | 11/1981 | Hanson . |
| 1,678,353 | 7/1928 | Reach .............................. 211/60 G X |
| 2,737,990 | 3/1956 | De Marco ....................... 294/146 X |
| 2,788,928 | 4/1957 | Des Fosses ..................... 224/922 X |
| 2,791,255 | 5/1957 | Ogden ............................. 294/146 X |
| 2,854,147 | 9/1958 | Derr ................................. 211/60 R |
| 2,999,622 | 9/1961 | Durham .......................... 294/159 |
| 3,674,190 | 7/1972 | Wright . |
| 3,772,819 | 11/1973 | Ratzlaff . |
| 3,889,860 | 6/1975 | Lindsey . |
| 4,003,612 | 1/1977 | Munsell ........................... 211/60 R X |
| 4,014,466 | 3/1977 | Wess et al. ...................... 294/162 |
| 4,170,801 | 10/1979 | Ward . |
| 4,311,262 | 1/1982 | Morin . |

Primary Examiner—Johnny D. Cherry
Attorney, Agent, or Firm—Finnegan, Henderson, Farabow, Garrett & Dunner

[57] ABSTRACT

A device for carrying fishing rods comprising first and second panel-like members and elongated members connected therebetween for maintaining the panel-like members in a generally co-planar relationship. The first panel-like member includes two opposite and generally planar sides having a handle along one edge thereof. Two clamps are adjustably affixed to the first panel-like member and have an inner surface disposed to engage the rods. The second panel-like member includes an adjustable clamp having an inner surface to engage the rods. Movement of the adjustable clamps of the first and second panel-like member forces the rods against the surface of the first and second panel-like members, respectively. The position of the second panel-like member is adjustable along the length of the elongated connecting members.

7 Claims, 4 Drawing Figures

U.S. Patent  Feb. 19, 1985  4,500,128
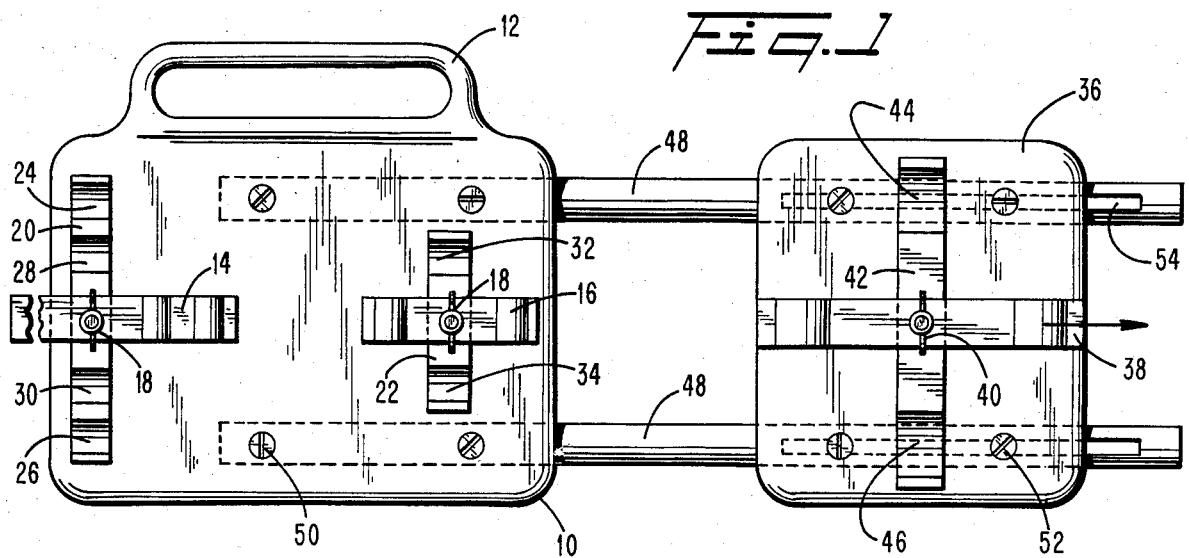
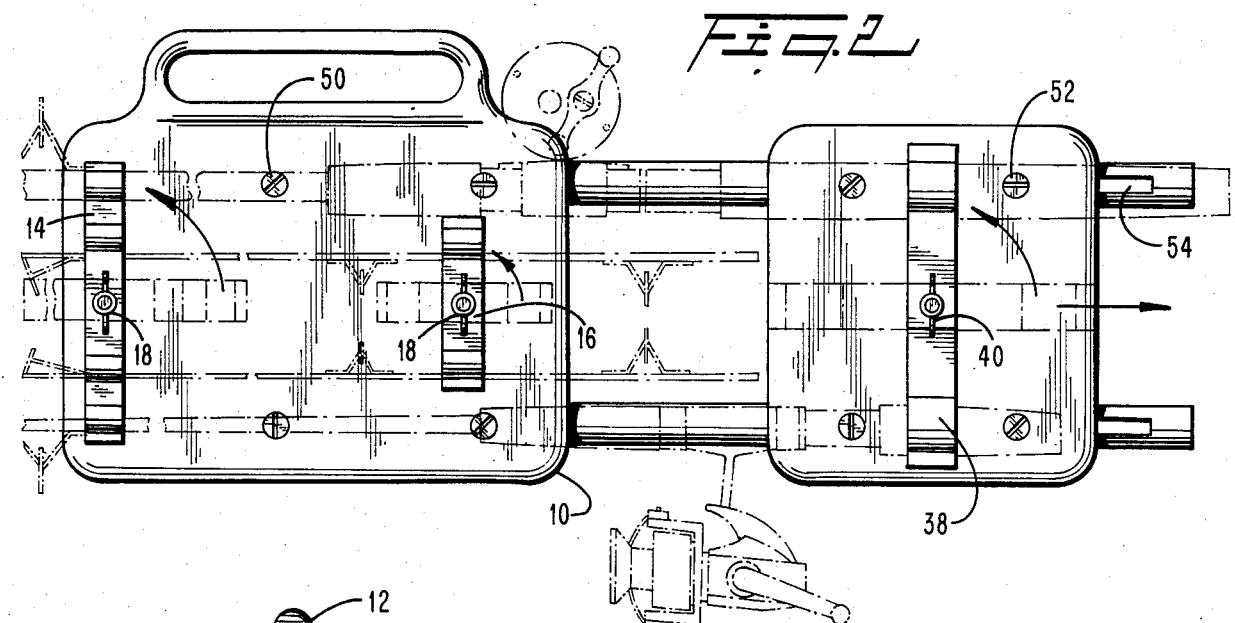
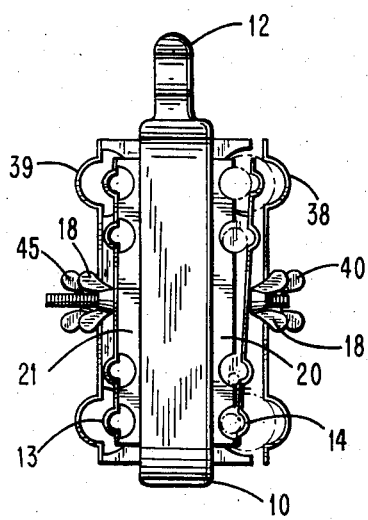
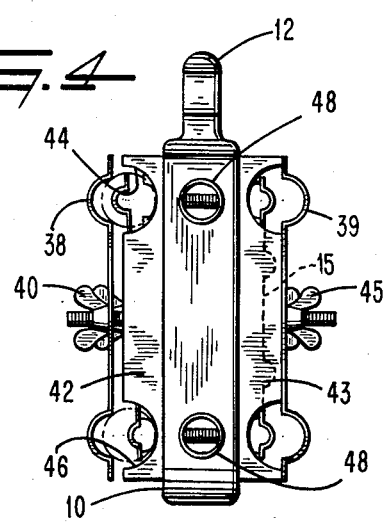

DEVICE FOR CARRYING FISHING RODS

BACKGROUND OF THE INVENTION

This invention relates generally to means for carrying fishing rods in a manner that is comfortable and convenient to the sportsman. The device is also useful for the storage of the various types of fishing rods.

A fishing rod, with or without an attached reel, is a cumbersome device to transport due to its length, flexibility and relative frailty. A number of devices have been proposed in the prior art to store and transport fishing rods, including closed cases, such as that disclosed in U.S. Pat. No. 4,170,801 to Ward. The prior art also includes open rack-like device, such as that depicted in U.S. Pat. No. 4,311,262 to Morin and other devices of a similar nature. While these devices will transport and store fishing rods, such devices are generally cumbersome, ill-balanced, and incapable of storing and transporting fishing rods of entirely different configurations.

It is the principal object of the present invention to provide a means for storing and carrying a fishing rod for fishing rods in such a manner that the rods are protected from damage, immobilized for convenient carrying in such a manner that the device is balanced and capable of being comfortably held at the side of the person carrying such a device.

It is an additional object of the present invention to provide a device for carrying fishing rods that is both simple to use and inexpensive to manufacture and capable of carrying a number of different types of fishing rods without the need for complex adjustment or specific configurations for a particular rod and reel combination.

Other objects of the present invention and its advantages over the prior art will be apparent from the detailed description of the preferred embodiment or may be learned by practice of the invention.

SUMMARY OF THE INVENTION

In accordance with the purposes of the invention, as embodied and broadly described herein, the device for carrying fishing rods of the present invention comprises a first panel-like member having two opposite generally planar sides and a handle along one edge. Clamp means are adjustably affixed to the first panel-like member which have an inner surface disposed to engage the fishing rods. The clamp means are adjustable, such that movement of the clamp means toward the first panel-like member forces the rods onto the surface of the first panel. The device further includes a second panel-like member having two opposite generally planar sides and clamp means adjustably affixed thereto. The clamp means have an inner surface disposed to engage the rods, and the clamp means is adjustable such that movement of the clamp means toward the second panel-like member forces the rods onto the surface of the second panel. The device further includes connecting means affixed to the panel-like members for maintaining the panels in a generally co-planar relationship.

Preferably, the clamp means are elongated clamp members having an inner rod engaging surface disposed to contact the rods and force them into contact with the panel-like members. It is further preferred that the first panel-like member have, on one side, two rod engaging surfaces, the first having four rod-engaging indentations, and a second rod engaging surface having two rod-engaging indentations. The indentations on the second rod engaging surface are preferably co-linear with the two centermost indentations on the first rod engaging surface.

BRIEF DESCRIPTION OF THE DRAWINGS

The present invention is disclosed by reference to a preferred embodiment depicted in the accompanying drawings which constitute a part of the specification.

FIG. 1 is a side view of one embodiment of the present invention.

FIG. 2 is a side view of the embodiment of FIG. 1 illustrating how two fishing rods would be clamped to the embodiment depicted.

FIG. 3 is an end view of the present invention.

FIG. 4 is the opposite end view of that depicted in FIG. 3.

DESCRIPTION OF THE PREFERRED EMBODIMENTS

The device for carrying fishing rods, in accordance with the present invention, includes a first panel-like member with two opposite generally planar sides and an elongated handle along its upper edge. The handle depicted herein is simply a loop-like opening 12 through which the first panel 10 can be grasped in order to carry the device and the associated fishing rods. Other handle configurations could be used and the configuration depicted is simply the preferred manner of forming the handle.

The first panel-like member includes clamp means adjustably affixed to the panel-like member having an inner surface disposed to engage the fishing rods. The clamp means are adjustable such that the movement of the clamp means toward the first panel-like member forces the rods onto the surface of the first panel. As here embodied, the clamp means comprise four clamp members 13 14, 15 and 16. As here embodied the clamp members are curved to conform generally with the shape of the rods being clamped. Such a configuration is only preferred and the clamp members could be straight or curved in another manner. In FIG. 1, the two clamp members 14 and 16 are shown generally parallel to the longitudinal direction of the first panel only to illustrate the preferred configuration of the panel 10 beneath the clamp members 14 and 16. In this embodiment the clamp members are affixed to the first panel by means of threaded fasteners and wing nuts 18. As is evident from FIG. 2, when the fishing rods are to be attached to the first panel-like member, the clamp members are rotated 90° from their position in FIG. 1 to engage the fishing rods. The wing nuts and the fasteners are then tightened and the movement of the clamps toward the first panel-like member forces the rods onto its surface.

For purposes of illustration the preferred embodiment is depicted with two fishing rods on one side of the device. As is evident from FIGS. 3 and 4, fishing rods may be attached to both sides of the device in the same way as is depicted in FIGS. 1 and 2. In such an embodiment the clamp members 13 and 15 would have the same basic configuration of clamp members 14 and 16. Clamp member 13 would be much the same as clamp member 16 and clamp member 15 would be much the same as clamp member 14.

Preferably, the first panel-like member also includes rod engaging surfaces adjacent the portions of the panel-like members beneath the clamp means. As here embodied and most clearly depicted in FIGS. 1 and 3, the panel 10 includes rod supports 20 and 22. Rod support 20 in this embodiment has four indentations on its outer surface, outermost pair 24 and 26, and an innermost pair 28 and 30. The panel 10 also includes on the rod support 22 two indentations 32 and 34. As is evident from FIG. 1, indentations 30 and 34 are generally co-linear, as are indentations 28 and 32. As is evident from FIG. 2, the two centermost indentations on the members 20 and 22 are disposed to engage shorter sections of the fishing rods while the indentations 24 and 26 engage the larger portions of the fishing rods.

FIG. 3 also illustrates that the preferrred embodiment include rod supports and clamp members on the side of the first panel 10 opposite that shown in FIGS. 1 and 2. Specifically, FIG. 3 shows rod support 21 which is similar in configuration and location to rod support 20 and clamp member 15 on the opposite side of panel 10.

In accordance with the invention, the device further includes a second panel-like member having clamp means adjustably affixed thereto. The clamp means have an inner surface disposed to engage the rods and the clamp means are adjustable such that movement of the clamp means toward the second panel-like member forces the rods onto the surface of the second panel.

As here embodied and most clearly depicted in FIGS. 1 and 2, the second panel 36 has a clamp member 38 adjustably affixed thereto by a threaded fastener and an associated wing nut 40. The clamp member 38 has an inner surface disposed to engage the fishing rods and, by means of the wing nut 40, force the rods into contact with the second panel 36. As here embodied, the panel 36 includes a rod engaging surface 42 having two grooves 44 and 46 therein. Preferably, the grooves 44 and 24 are approximately co-linear, as are the grooves 46 and 26. In this manner, the longer sections of the fishing rod are engaged by the grooves 24 and 44, respectively, and 26 and 46, respectively, as depicted in FIG. 2.

The side of the panel 36 opposite the one depicted in FIGS. 1 and 2 preferably includes another rod engaging surface as shown in FIG. 4, rod engaging surface 43. Associated therewith is a clamp member 39 and in addition fastener and wing nut 45 disposed to clamp an additional pair of fishing rods (not shown) to the other side of the device.

In accordance with the invention, the device further includes connecting means affixed to the panel-like members for maintaining the panels in a generally co-planar relationship. As here embodied and depicted in FIGS. 1, 2 and 4, the connecting means are a pair of tubular members 48 affixed to the first panel 10 by means of fasteners 50. The connecting members 48 are affixed to the second panel 36 by means of fasteners 52, which engage the members 48 through elongated slots 54 to provide lateral adjustment of the second panel 36 in relation to the first panel 10. In such a manner, the device of the present invention can accommodate fishing rods of different dimensions and, as depicted in FIG. 2, the device can accommodate fishing rods with the reels attached thereto without interference with the carrying device.

As depicted in the present Figures and as set out above, the present invention provides a convenient and simple manner of carrying fishing rods. The scope of the present invention is not to be confined to the embodiment depicted, but is to be determined by the claims appended thereto.

What is claimed is:

1. A device for carrying fishing rods comprising:
   (a) a first panel-like member having two opposite generally planar sides and a handle along one edge thereof, clamp means adjustably affixed to said first panel-like member, said clamp means having an inner surface disposed to engage said rods, said clamp means being adjustable such that movement of said clamp means toward said first panel-like member forces said rods against the surface of said first panel-like member;
   (b) a second panel-like member having clamp means adjustably affixed thereto, said clamp means having an inner surface disposed to engage said rods, said clamp means being adjustable such that movement of said clamp means toward said second panel-like member forces said rods against the surface of said second panel-like member; and
   (c) connecting means affixed to said panel-like members for maintaining said first and second panel-like members in a generally co-planar relationship, said connecting means being elongated members affixed to said first and second panel-like members, said second panel-like member being adjustable along the length of said connecting members.

2. The device of claim 1 wherein said clamp means are elongated clamping members, said clamping members having an inner rod engaging surface disposed to contact said rods and force them into contact with said panel-like members.

3. The device of claim 2 wherein said first panel-like member has, on one side, two rod engaging surfaces, a first rod engaging surface having four rod engaging indentations and a second rod engaging surface having two rod engaging indentations, said indentations on said second rod engaging surface being co-linear with the two centermost indentations on said first rod engaging surface.

4. The device of claim 3 wherein said four co-linear rod engaging indentations have a diameter disposed to engage the smaller sections of said rods.

5. The device of claim 1 wherein said panel-like members include rod engaging indentations on said clamp means.

6. The device of claim 1 wherein said first and second panel-like members have clamp means on both sides.

7. A device for carrying fishing rods comprising:
   (a) a first panel-like member having two opposite generally planar sides and a handle along one edge thereof, each side of said first panel-like member including a first rod engaging surface having four indentations disposed to engage said rods and a second rod engaging surface having two indentations disposed to engage said rods, said two indentations on said second rod engaging surface being co-linear with the central two indentations on said first rod engaging surface, each side of said first panel-like member further including two clamp means adjustably affixed to one side of said first panel-like member adjacent said rod engaging surfaces, said clamp means comprising elongated clamp members, a first clamp member having on its inner surface four indentations disposed to engage said rods and a second clamping member having two indentations on its inner surface disposed to engage said rods, said two indentations on said second clamping member being co-linear with the central two indentations on said first clamping member, fastening means disposed to force said clamp members toward said rod engaging surfaces on said first panel-like member and thereby engage said rods between said clamp members and said rod engaging surfaces;

(b) a second panel-like member having two opposite generally planar sides, each side of said second panel-like member including a rod engaging surface having an inner surface with two indentations therein disposed to engage said rods, said two indentations being co-linear with the outer two indentations in said first rod engaging surface on said first panel-like member, each side of said second panel-like member further including clamp means adjustably affixed to one side of said second panel-like member, said clamp means comprised of an elongated clamp member having an inner surface with two indentations therein disposed to engage said rods, said two indentations being co-linear with the outer two indentations in said first clamp member on said first panel-like member, fastening means disposed to force said clamp member toward said rod engaging surfaces on said second panel-like member and thereby engage said rods between said clamp member and said rod engaging surface on said second panel-like member; and (c) two elongated connecting members affixed to said first and said second panel-like members, said connecting members maintaining said panel-like members in a generally co-linear relationship while providing means for adjusting the distance between said panel-like members.

* * * * *